(12) United States Patent
Zisimopoulos et al.

(10) Patent No.: US 11,622,272 B2
(45) Date of Patent: Apr. 4, 2023

(54) RESTRICTED ACCESS PROCEDURE

(71) Applicant: QUALCOMM Incorporated, San Diego, CA (US)

(72) Inventors: Haris Zisimopoulos, London (GB); Sebastian Speicher, Wallisellen (CH); Rajat Prakash, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 64 days.

(21) Appl. No.: 17/248,044

(22) Filed: Jan. 6, 2021

(65) Prior Publication Data

US 2021/0211879 A1   Jul. 8, 2021

Related U.S. Application Data

(60) Provisional application No. 62/958,208, filed on Jan. 7, 2020.

(51) Int. Cl.
*H04W 12/08* (2021.01)
*H04W 60/00* (2009.01)
*H04W 48/16* (2009.01)
*H04W 12/06* (2021.01)

(52) U.S. Cl.
CPC ......... *H04W 12/08* (2013.01); *H04W 12/068* (2021.01); *H04W 48/16* (2013.01); *H04W 60/00* (2013.01)

(58) Field of Classification Search
CPC ... H04W 12/08; H04W 12/068; H04W 48/16; H04W 60/00; H04W 12/06; H04W 12/0471; H04W 48/00
See application file for complete search history.

(56) References Cited

U.S. PATENT DOCUMENTS

| | | | |
|---|---|---|---|
| 10,986,568 B1* | 4/2021 | Jagannatha | H04W 8/183 |
| 2019/0268835 A1* | 8/2019 | Shan | H04W 48/16 |
| 2019/0335392 A1* | 10/2019 | Qiao | H04W 80/02 |
| 2021/0058784 A1* | 2/2021 | Kedalagudde | H04W 48/18 |
| 2022/0110050 A1* | 4/2022 | Won | H04W 48/18 |

* cited by examiner

*Primary Examiner* — Wayne H Cai
(74) *Attorney, Agent, or Firm* — Harrity & Harrity, LLP

(57) ABSTRACT

Various aspects of the present disclosure generally relate to wireless communication. In some aspects, a user equipment (UE) may transmit a registration request for restricted access (RA), wherein the registration request selectively includes an onboarding access request. The UE may selectively communicate with an onboarding network to authenticate and authorize a particular network based at least in part on whether the registration request includes the onboarding access request. The UE may complete the RA registration after transmitting the registration request and based at least in part on selectively communicating with the onboarding network to authenticate and authorize the particular network. Numerous other aspects are described.

30 Claims, 8 Drawing Sheets

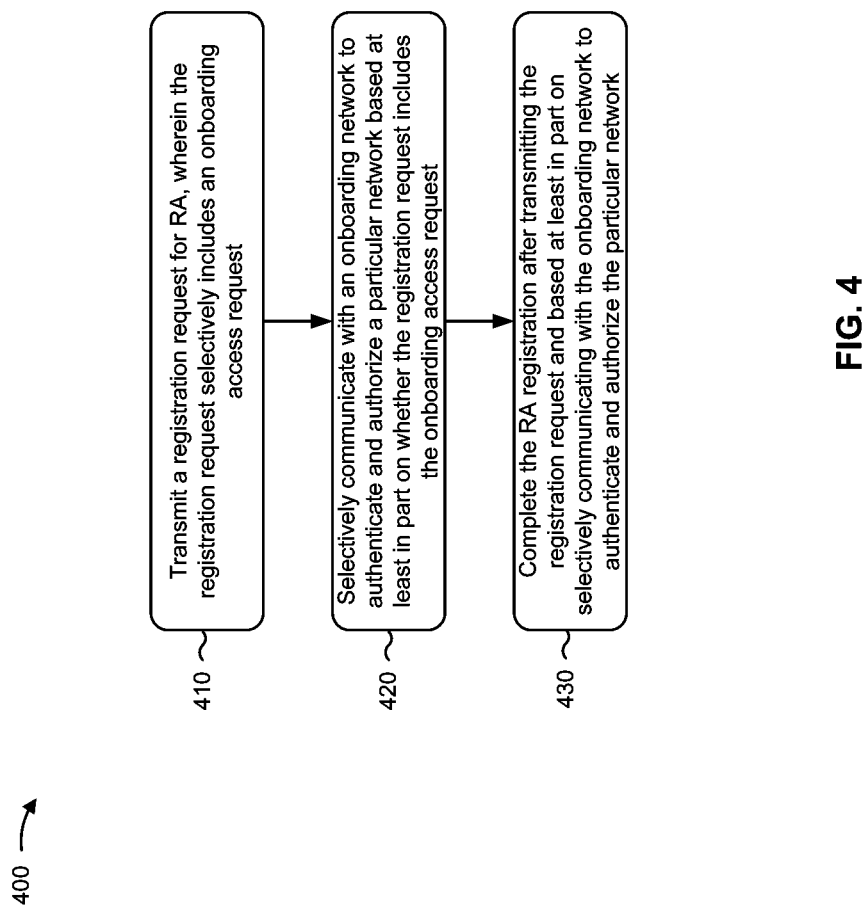

RESTRICTED ACCESS PROCEDURE

CROSS-REFERENCE TO RELATED APPLICATION

This patent application claims priority to U.S. Provisional Patent Application No. 62/958,208, filed on Jan. 7, 2020, entitled "RESTRICTED ACCESS PROCEDURE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for a restricted access procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) includes transmitting a registration request for restricted access (RA), wherein the registration request selectively includes an onboarding access request; selectively communicating with a onboarding network to authenticate and authorize a particular network based at least in part on whether the registration request includes the onboarding access request; and completing the RA registration after transmitting the registration request and based at least in part on selectively communicating with the onboarding network to authenticate and authorize the particular network.

In some aspects, a method of wireless communication performed by a network device includes providing a system information block indicator identifying a set of levels of RA for onboarding, wherein the set of levels includes at least one of an unauthenticated level or an onboarding with default credentials level; receiving, from a UE and as a response to the system information block indicator, a registration request for RA registration, wherein the registration request selectively includes an onboarding access request; selectively communicating with the UE to authenticate and authorize a network at least in part on whether the registration request includes the onboarding access request; and completing the RA registration after receiving the registration request and based at least in part on selectively communicating with the UE to authenticate and authorize the network.

In some aspects, a method of wireless communication performed by a core network node includes receiving, from a UE and as a response to a system information block indicator, an onboarding access request; triggering a network authentication and authorization procedure using a stored profile of an authorization and authentication (AAA) server; transmitting, based at least in part on executing the authentication and authorization procedure, an indicator of a UE route selection policy (URSP) identifying a network selection policy, wherein the network selection policy includes information identifying a set of applications that are authorized to use restricted access; and communicating with the AAA server to complete the authentication and authorization procedure based at least in part on transmitting the indicator of the URSP.

In some aspects, a method of wireless communication, performed by a UE, may include transmitting, when operating in a limited service state, a registration request for RA, wherein the registration request selectively includes an onboarding access request; selectively communicating with a network to authenticate and authorize a particular network slice based at least in part on whether the registration request includes the onboarding access request; and completing RA registration after transmitting the registration request and based at least in part on selectively communicating with the network to authenticate and authorize the particular network slice.

In some aspects, a method of wireless communication, performed by a network device, may include providing a system information block indicator identifying a set of levels of RA, wherein the set of levels includes at least one of an unauthenticated level or an onboarding with credentials level; receiving, from a UE operating in a limited service state and as a response to the system information block indicator, a registration request for RA registration, wherein the registration request selectively includes an onboarding access request selectively communicating with the UE to authenticate and authorize a network slice based at least in part on whether the registration request includes the onboarding access request; and completing RA registration after receiving the registration request and based at least in part on selectively communicating with the UE to authenticate and authorize the network slice.

In some aspects, a method of wireless communication, performed by a core network node, may include receiving, from a UE operating in a limited service state and as a response to a system information block indicator, an onboarding access request; triggering a network slice-specific authentication and authorization (NSSAA) procedure using a stored profile of an AAA server; transmitting, based at least in part on executing the NSSAA procedure, an indicator of a URSP identifying a network slice selection policy, wherein the network slice selection policy includes information identifying a set of applications that are authorized to use a single network slice selection assistance information (S-NSSAI) for restricted access; and communicating with the AAA server to complete the NSSAA procedure based at least in part on transmitting the indicator of the URSP.

In some aspects, a UE for wireless communication may include memory and one or more processors operatively coupled to the memory. The memory and the one or more processors may be configured to transmit, when operating in a limited service state, a registration request for RA, wherein the registration request selectively includes an onboarding access request; selectively communicate with a network to authenticate and authorize a particular network slice based at least in part on whether the registration request includes the onboarding access request; and complete RA registration after transmitting the registration request and based at least in part on selectively communicating with the network to authenticate and authorize the particular network slice.

In some aspects, a network device for wireless communication may include memory and one or more processors operatively coupled to the memory. The memory and the one or more processors may be configured to provide a system information block indicator identifying a set of levels of RA, wherein the set of levels includes at least one of an unauthenticated level or an onboarding with credentials level; receive, from a UE operating in a limited service state and as a response to the system information block indicator, a registration request for RA registration, wherein the registration request selectively includes an onboarding access request selectively communicate with the UE to authenticate and authorize a network slice based at least in part on whether the registration request includes the onboarding access request; and complete RA registration after receiving the registration request and based at least in part on selectively communicating with the UE to authenticate and authorize the network slice.

In some aspects, a core network node for wireless communication may include memory and one or more processors operatively coupled to the memory. The memory and the one or more processors may be configured to receive, from a UE operating in a limited service state and as a response to a system information block indicator, an onboarding access request; trigger a NSSAA procedure using a stored profile of an AAA server; transmit, based at least in part on executing the NSSAA procedure, an indicator of a URSP identifying a network slice selection policy, wherein the network slice selection policy includes information identifying a set of applications that are authorized to use a S-NSSAI for restricted access; and communicate with the AAA server to complete the NSSAA procedure based at least in part on transmitting the indicator of the URSP.

In some aspects, a non-transitory computer-readable medium may store one or more instructions for wireless communication. The one or more instructions, when executed by one or more processors of a UE, may cause the one or more processors to: transmit, when operating in a limited service state, a registration request for RA, wherein the registration request selectively includes an onboarding access request; selectively communicate with a network to authenticate and authorize a particular network slice based at least in part on whether the registration request includes the onboarding access request; and complete RA registration after transmitting the registration request and based at least in part on selectively communicating with the network to authenticate and authorize the particular network slice.

In some aspects, a non-transitory computer-readable medium may store one or more instructions for wireless communication. The one or more instructions, when executed by one or more processors of a network device, may cause the one or more processors to: provide a system information block indicator identifying a set of levels of RA, wherein the set of levels includes at least one of an unauthenticated level or an onboarding with credentials level; receive, from a UE operating in a limited service state and as a response to the system information block indicator, a registration request for RA registration, wherein the registration request selectively includes an onboarding access request selectively communicate with the UE to authenticate and authorize a network slice based at least in part on whether the registration request includes the onboarding access request; and complete RA registration after receiving the registration request and based at least in part on selectively communicating with the UE to authenticate and authorize the network slice.

In some aspects, a non-transitory computer-readable medium may store one or more instructions for wireless communication. The one or more instructions, when executed by one or more processors of a core network node, may cause the one or more processors to: receive, from a UE operating in a limited service state and as a response to a system information block indicator, an onboarding access request; trigger a NSSAA procedure using a stored profile of an AAA server; transmit, based at least in part on executing the NSSAA procedure, an indicator of a URSP identifying a network slice selection policy, wherein the network slice selection policy includes information identifying a set of applications that are authorized to use a S-NSSAI for restricted access; and communicate with the AAA server to complete the NSSAA procedure based at least in part on transmitting the indicator of the URSP.

In some aspects, an apparatus for wireless communication may include means for transmitting, when operating in a limited service state, a registration request for RA, wherein the registration request selectively includes an onboarding access request; means for selectively communicating with a network to authenticate and authorize a particular network slice based at least in part on whether the registration request includes the onboarding access request; and means for completing RA registration after transmitting the registration request and based at least in part on selectively communicating with the network to authenticate and authorize the particular network slice.

In some aspects, an apparatus for wireless communication may include means for providing a system information block indicator identifying a set of levels of RA, wherein the set of levels includes at least one of an unauthenticated level or an onboarding with credentials level; means for receiving, from a UE operating in a limited service state and as a response to the system information block indicator, a registration request for RA registration, wherein the registration request selectively includes an onboarding access request means for selectively communicating with the UE to authenticate and authorize a network slice based at least in part on whether the registration request includes the onboarding access request; and means for completing RA registration after receiving the registration request and based at least in part on selectively communicating with the UE to authenticate and authorize the network slice.

In some aspects, an apparatus for wireless communication may include means for receiving, from a UE operating in a limited service state and as a response to a system information block indicator, an onboarding access request; means for triggering a NSSAA procedure using a stored profile of an AAA server; means for transmitting, based at least in part on executing the NSSAA procedure, an indicator of a URSP identifying a network slice selection policy, wherein the network slice selection policy includes information identifying a set of applications that are authorized to use a S-NSSAI for restricted access; and means for communicating with the AAA server to complete the NSSAA procedure based at least in part on transmitting the indicator of the URSP.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
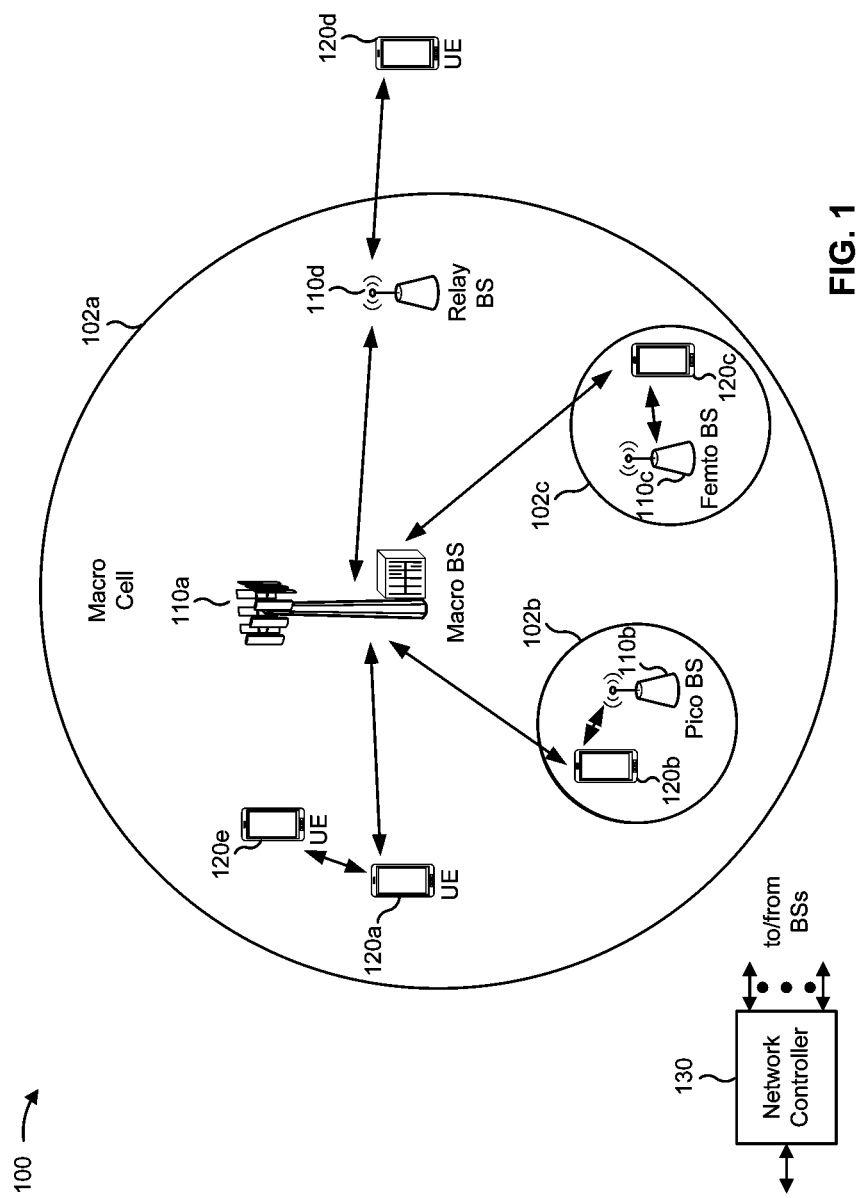
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
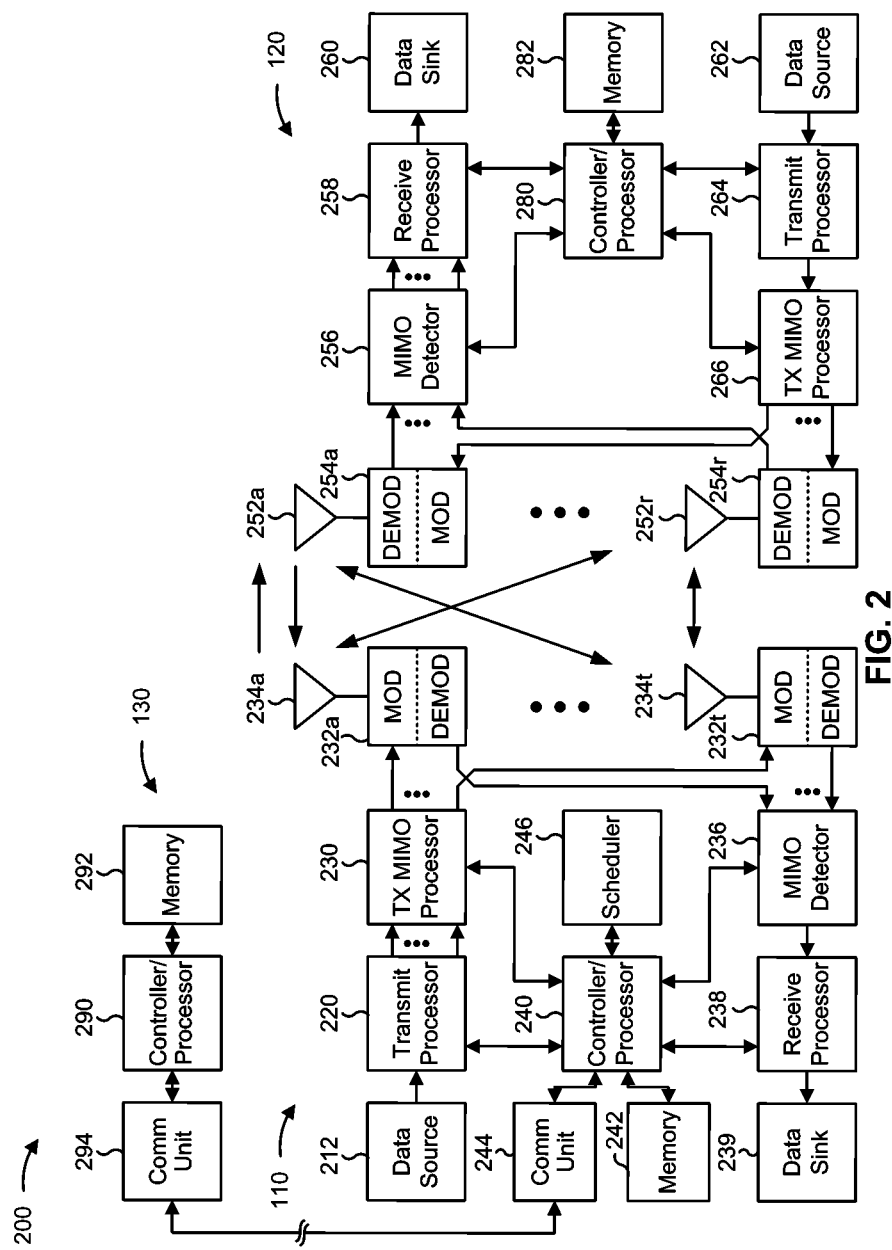
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a restricted access procedure, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, process 600 of FIG. 6, and/or other processes as described herein. A scheduler 246 may schedule UEs for data transmission on the downlink and/or uplink.

In some aspects, UE 120 may include means for transmitting a registration request for restricted access (RA), wherein the registration request selectively includes an onboarding access request, means for selectively communicating with an onboarding network to authenticate and authorize a particular network based at least in part on whether the registration request includes the onboarding access request, means for completing RA registration after transmitting the registration request and based at least in part on selectively communicating with the onboarding network to authenticate and authorize the particular network, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a network device or core network device (e.g., base station 110, network controller 130, and/or the like) may include means for providing a system information block indicator identifying a set of levels of RA for onboarding, wherein the set of levels includes at least one of an unauthenticated level or an onboarding with default credentials level, means for receiving, from a UE as a response to the system information block indicator, a registration request for RA registration, wherein the registration request selectively includes an onboarding access request, means for selectively communicating with the UE to authenticate and authorize a network based at least in part on whether the registration request includes the onboarding access request, means for completing RA registration after receiving the registration request and based at least in part on selectively communicating with the UE to authenticate and authorize the network, and/or the like. Additionally, or alternatively, the network device or core network device may include means for receiving, from a UE operating in a limited service state and as a response to a system information block indicator, an onboarding access request, means for triggering a network authentication and authorization procedure using a stored profile of an AAA server, means for transmitting, based at least in part on executing the network authentication and authorization procedure, an indicator of a URSP identifying a network selection policy, wherein the network selection policy includes information identifying a set of applications that are authorized for restricted access, means for communicating with the AAA server to complete the network authentication and authorization procedure based at least in part on transmitting the indicator of the URSP, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In some communications systems, a UE may attempt to obtain access to a network despite lacking a regular access credential for authentication in the network. For example, a UE in a limited service state without a subscription for the network but with a restricted access credential may attempt to obtain restricted access to the network. This may occur during onboarding scenarios when a UE attempts to connect to a network for the first time and lacks authentication credentials (e.g., the UE will receive authentication credentials after onboarding is complete). Similarly, during credit card roaming scenarios, a UE may connect to a network without regular access credentials, pay for roaming access using a credit card, and receive temporary credentials for subsequent restricted access. In LTE communications systems, the UE may use a provisioning for restricted local operator services (PaRLOS) procedure to obtain restricted access.

However, although the PaRLOS procedure enables unauthenticated access, the PaRLOS procedure does not permit authenticated access. Moreover, in LTE, a defined list of applications is enabled to use a restricted local operator service (RLOS) connection, which may prevent usability of the RLOS connection by other applications. Furthermore, a PaRLOS procedure for initiation of an RLOS connection may be defined to include a user interaction step to confirm a desire to initiate the RLOS connection, which may prevent implementation in MTC UEs, D2D UEs, V2X UEs, and/or the like. This may also result in excessive delay in obtaining an RLOS connection.

Some aspects described herein enable improved RA procedures. For example, a UE in a limited service state may transmit a registration request for RA that selectively includes an onboarding access request and a BS may selectively grant the request based at least in part on a mode of the UE and whether the registration request includes the onboarding access request. In this case, the BS, the UE, and one or more core network nodes may communicate to complete an initial registration of the UE for RA and may establish a protocol data unit (PDU) session for RA. In some aspects, the BS, the UE, and the one or more core network nodes may use a network authentication and authorization procedure, such as network slice-specific authentication and authorization (NSSAA), to enable both unauthenticated access and authenticated access, thereby providing improved flexibility relative to using a PaRLOS procedure. Moreover, the BS, the UE, and the one or more core network nodes may enable a UE-specific policy (e.g., a network selection policy, such as a network slice selection policy (NSSP)) for onboarding access, which may enable a provisioned list of applications (e.g., of the UE) to access control of onboarding. Furthermore, the BS, the UE, and the one or more ore network nodes may automate one or more communication exchanges, thereby obviating a need for manual selection, which may enable utilization with various types of UEs, reduce a delay in obtaining RA, and/or the like.

Figure 3A:
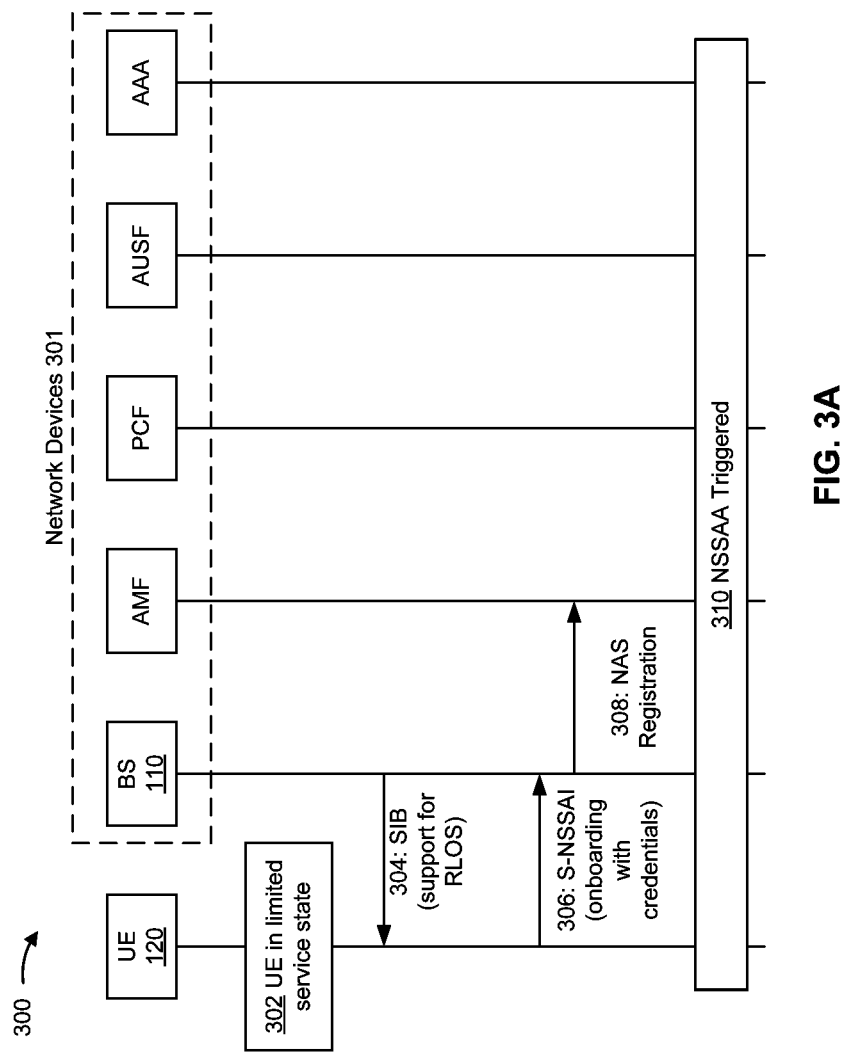
FIGS. 3A-3C are diagrams illustrating an example of a restricted access procedure, in accordance with various aspects of the present disclosure.
Figure 3B:
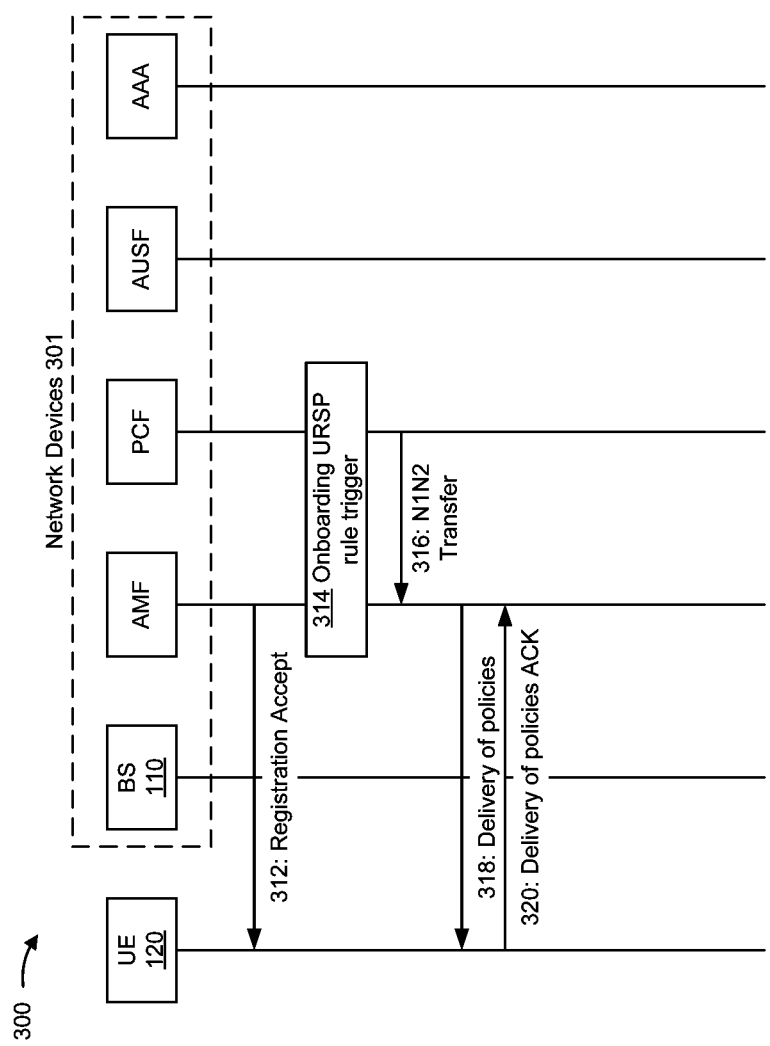
Figure 3C:
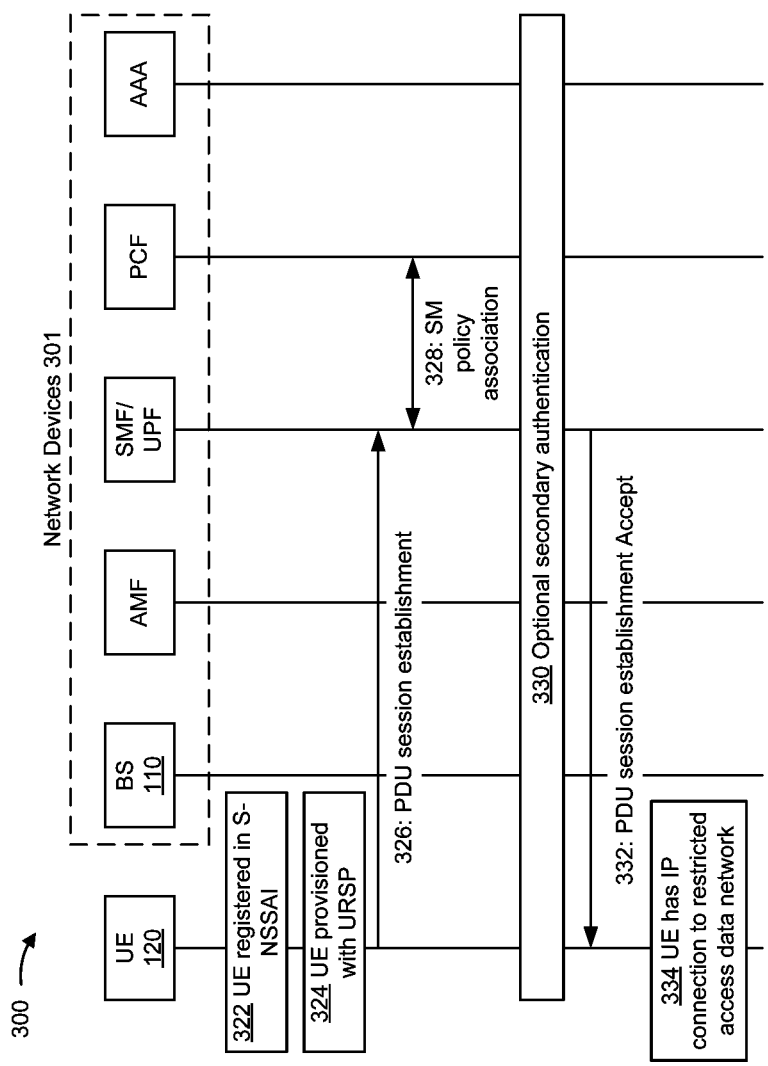

FIGS. 3A-3C are diagrams illustrating an example 300 of a restricted access procedure, in accordance with various aspects of the present disclosure. As shown in FIG. 3A, example 300 includes a UE 120, a BS 110, and one or more other network devices 301 and/or core network nodes. The one or more other network devices 301 and/or core network nodes may include an access and mobility management function (AMF), a policy control function (PCF), authentication server function (AUSF), an authentication, authorization, and accounting (AAA) function, a session management function (SMF), a user plane function (UPF), and/or the like.

As further shown in FIG. 3A, and by reference number 302, UE 120 may, initially, be operating in a limited service state. As shown by reference number 304, UE 120 may receive a system information block (SIB) message. For example, UE 120 may receive, from BS 110, a SIB type-1 (SIB1) indicating that BS 110 supports RLOS. Additionally, or alternatively, UE 120 may receive a query-response message or another type of message to indicate that BS 110 and a radio access network (RAN) associated therewith support RLOS. In some aspects, the SIB message may include information identifying levels of support for RA in a RAN provided by BS 110 and the one or more other network devices. For example, BS 110 may provide a SIB message indicating an availability of an unauthenticated level of support, an onboarding with credentials level of support, and/or the like. In some aspects, the RAN may be a Stand-alone Non-Public Network (SNPN), a Public Land Mobile Network (PLMN), and/or the like. In this case, UE 120 may select, for example, an SNPN from a group of available SNPNs based at least in part on the SNPN being included in a pre-configured list for onboarding. Additionally, or alternatively, UE 120 may receive a user selection of the SNPN.

As further shown in FIG. 3A, and by reference number 306, UE 120 may provide, to BS 110 and the one or more other network devices, a registration request. For example, UE 120 may transmit a single network slice selection assistance information (S-NSSAI) to convey an onboarding request with credentials. In this case, UE 120 may include, in the S-NSSAI, a slice service type (SST) indicator to indicate that the S-NSSAI is for the onboarding with credentials level of access. In some aspects, the SST indicator may be defined (e.g., in a specification) with a value indicating that a slice is to be used for onboarding in an SNPN. In some aspects, BS 110 and the one or more other network devices may receive the registration request using a radio resource control (RRC) message, a non-access stratum (NAS) message, and/or the like, as shown by reference number 308. For example, BS 110 may provide an NAS registration message to the AMF to indicate that the S-NSSAI is for the onboarding with credentials level of access. In some aspects, UE 120 may use a particular type of extensible authentication protocol (AP) procedure for the S-NSSAI. For example, UE 120 may include a slice descriptor (SD) in the S-NSSAI that triggers extensible authentication protocol (EAP) transport layer security (TLS), EAP message-digest algorithm (MD5), and/or the like with a particular AAA server. In some aspects, UE 120 may use one or more other SDs defined for a particular Stand-alone Non-Public Network (SNPN).

In this case, UE 120, BS 110, and the one or more other network devices may trigger network slice-specific authentication and authorization (NSSAA) based at least in part on the S-NSSAI, as shown by reference number 310. For example, UE 120 may communicate with the one or more other network devices, as described in more detail herein, to authenticate using NSSAA using a stored credential, thereby enabling authenticated access. In this case, the AMF may use a service descriptor (SD) of the S-NSSAI based at least in part on UE 120 lacking a subscription to the RAN. As shown in FIG. 3B, and by reference number 312, the AMF may provide a registration accept message to UE 120 via BS 110, and may communicate with the PCF to provide an onboarding UE route selection policy (URSP), as shown by reference numbers 314 and 316. In some aspects, the URSP may include information identifying the AAA (e.g., a destination Internet Protocol (IP) address or a fully qualified domain name (FQDN)) that UE 120 is to communicate with for an NSSAA procedure. In some aspects, the PCF may provision the URSP to restrict access to the onboarding to a subset of applications, destination IP addresses, data network names (DNNs), and/or the like.

As further shown in FIG. 3B, and by reference numbers 318 and 320, the AMF may deliver one or more policies to UE 120 and UE 120 may transmit an acknowledgement. For example, the AMF may provide, via BS 110, a URSP identifying a network slice selection policy. In this case, the network slice selection policy may include information identifying a set of applications that are authorized to use the S-NSSAI for RA, one or more IP addresses or FQDNs for the AAA, and/or the like.

As shown in FIG. 3C, and by reference numbers 322 and 324, after communicating with BS 110 and the one or more network devices, as described above, UE 120 may be registered in an S-NSSAI and provisioned with a URSP. As shown by reference number 326, UE 120 may transmit a message to the AMF and/or the SMF/UPF to initiate PDU session establishment. For example, UE 120 may provide a message indicating that the S-NSSAI is for onboarding with credentials and identifying a DNN that UE 120 is to use. As shown by reference number 328, the SMF/UPF may communicate with the PCF for session management (SM) policy association. For example, the SMF/UPF and the PCF may allow access to a specified IP address or port range for a PDU session established for UE 120. In some aspects, as shown by reference number 330, a secondary authentication procedure may occur. For example, some DNNs may trigger a DNN-specific secondary authentication procedure with UE 120.

As further shown in FIG. 3C, and by reference numbers 332 and 334, the SMF/UPF may provide a PDU session establishment accept message and UE 120 may, based at least in part on receiving the PDU session establishment accept message, have an IP connection for RA in a data network. In some aspects, UE 120 may receive a protocol configuration option (PCO) extension identifying an IP address or FQDN of a provisioning server. In this way, UE 120 may obtain RA in a data network with credentials.

As indicated above, FIGS. 3A-3C are provided as examples. Other examples may differ from what is described with respect to FIGS. 3A-3C.

FIG. 4 is a diagram illustrating an example process 400 performed, for example, by a UE, in accordance with various aspects of the present disclosure. Example process 400 is an example where the UE (e.g., UE 120 and/or the like) performs operations associated with a restricted access procedure.

As shown in FIG. 4, in some aspects, process 400 may include transmitting a registration request for RA, wherein the registration request selectively includes an onboarding access request (block 410). For example, the UE (e.g., using controller/processor 280, transmit processor 264, TX MIMO processor 266, MOD 254, antenna 252, and/or the like) may transmit a registration request for RA, as described above. In some aspects, the registration request selectively includes an onboarding access request. For example, the registration request may include the onboarding access request with credentials to trigger registration for an onboarding with credentials level of RA. Additionally, or alternatively, the registration request may omit the onboarding access request with credentials. In this case, registration for unauthenticated access may be triggered. In some aspects, the UE may be operating in a limited service state.

As shown in FIG. 4, in some aspects, process 400 may include selectively communicating with an onboarding network to authenticate and authorize a particular network based at least in part on whether the registration request includes the onboarding access request (block 420). For example, the UE (e.g., using controller/processor 280, transmit processor 264, TX MIMO processor 266, MOD 254, antenna 252, and/or the like) may selectively communicate with an onboarding network to authenticate and authorize a particular network based at least in part on whether the registration request includes the onboarding access request, as described above.

As further shown in FIG. 4, in some aspects, process 400 may include completing the RA registration after transmitting the registration request and based at least in part on selectively communicating with the onboarding network to authenticate and authorize the particular network (block 430). For example, the UE (e.g., using controller/processor 280, transmit processor 264, TX MIMO processor 266, MOD 254, antenna 252, and/or the like) may complete the RA registration after transmitting the registration request and based at least in part on selectively communicating with the onboarding network to authenticate and authorize the particular network, as described above.

Process 400 may include additional aspects, such as any single aspect or any combination of aspects described below and/or in connection with one or more other processes described elsewhere herein.

In a first aspect, process 400 includes connecting to a full access credentials provisioning server based at least in part on successfully completing the RA registration.

In a second aspect, alone or in combination with the first aspect, the network is an SNPN or PLMN.

In a third aspect, alone or in combination with one or more of the first and second aspects, process 400 includes receiving a system information block indicator including information identifying one or more levels of restricted access, wherein the one or more is leveling include at least one of an authenticated level or an onboarding with credentials level.

In a fourth aspect, alone or in combination with one or more of the first through third aspects, the onboarding access request includes a S-NSSAI with a SST indicator set to a configured value for onboarding purpose.

In a fifth aspect, alone or in combination with one or more of the first through fourth aspects, the registration request is included in at least one of a radio resource control message or a non-access stratum message.

In a sixth aspect, alone or in combination with one or more of the first through fifth aspects, the registration request is for onboarding purpose, includes credentials, and is included in at least one of a radio resource control message or a non-access stratum message.

In a seventh aspect, alone or in combination with one or more of the first through sixth aspects, selectively communicating with the network includes performing a NSSAA procedure using a stored credential.

In an eighth aspect, alone or in combination with one or more of the first through seventh aspects, an extensible access protocol authentication procedure of the NSSAA procedure is based at least in part on a service descriptor value of the onboarding access request.

In a ninth aspect, alone or in combination with one or more of the first through eighth aspects, an AAA server is selected based at least in part on an indicated descriptor value of the onboarding access request.

In a tenth aspect, alone or in combination with one or more of the first through ninth aspects, selectively communicating with the network includes receiving an indicator of a URSP identifying a network selection policy, wherein the network selection policy includes information identifying a set of applications that are authorized to use a S-NSSAI for restricted access.

In an eleventh aspect, alone or in combination with one or more of the first through tenth aspects, selectively communicating with the network includes receiving an indicator of a URSP identifying a network selection policy, wherein the network selection policy includes information identifying one or more of destination Internet Protocol addresses or fully qualified domain names that are authorized for use with a S-NSSAI for restricted access.

In a twelfth aspect, alone or in combination with one or more of the first through eleventh aspects, process 400 includes enforcing a UE route selection policy based at least in part on receiving an indicator of the UE route selection policy.

In a thirteenth aspect, alone or in combination with one or more of the first through twelfth aspects, completing the RA registration includes establishing one or more protocol data unit sessions at one or more data network names associated with one or more of a set of applications based at least in part on a UE route selection policy.

In a fourteenth aspect, alone or in combination with one or more of the first through thirteenth aspects, an onboarding access request includes a new access indicator set to a configured value for onboarding purpose.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
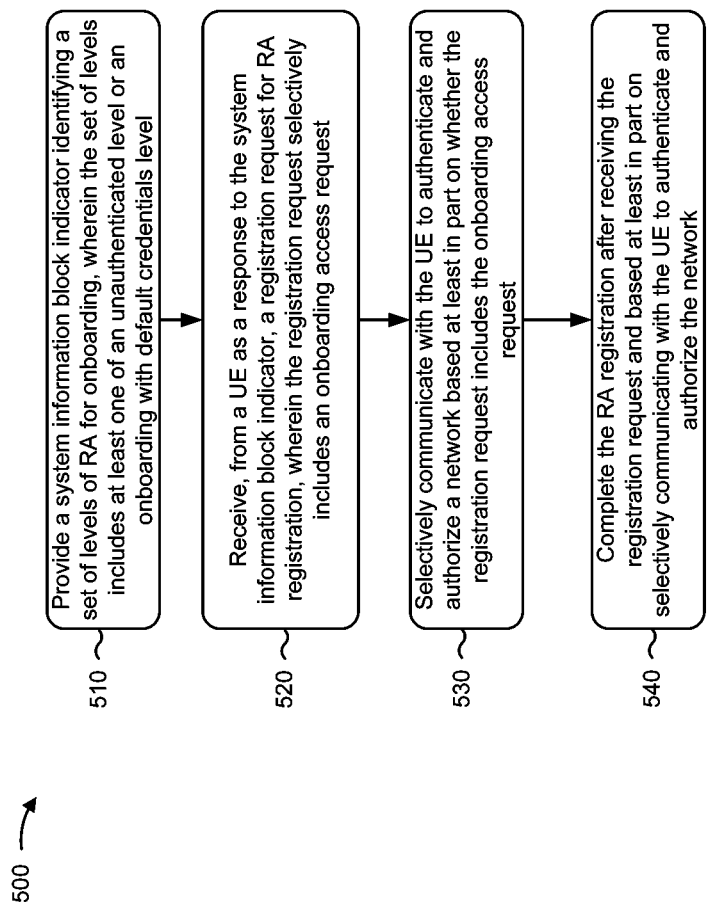
FIG. 5 is a diagram illustrating an example process performed, for example, by a network device, in accordance with various aspects of the present disclosure.

FIG. 5 is a diagram illustrating an example process 500 performed, for example, by a BS, in accordance with various aspects of the present disclosure. Example process 500 is an example where the network device (e.g., BS 110 and/or the like) performs operations associated with a restricted access procedure.

As shown in FIG. 5, in some aspects, process 500 may include providing a system information block indicator identifying a set of levels of RA for onboarding, wherein the set of levels includes at least one of an unauthenticated level or an onboarding with default credentials level (block 510). For example, the network device (e.g., using transmit processor 220, receive processor 238, controller/processor 240, memory 242, and/or the like) may provide a system information block indicator identifying a set of levels of RA for onboarding, as described above. In some aspects, the set of levels includes at least one of an unauthenticated level or an onboarding with default credentials level.

As further shown in FIG. 5, in some aspects, process 500 may include receiving, from a UE as a response to the system information block indicator, a registration request for RA registration, wherein the registration request selectively includes an onboarding access request (block 520). For example, the network device (e.g., using transmit processor 220, receive processor 238, controller/processor 240, memory 242, and/or the like) may receive, from a UE and as a response to the system information block indicator, a registration request for RA registration, as described above. In some aspects, the registration request selectively includes an onboarding access request.

As further shown in FIG. 5, in some aspects, process 500 may include selectively communicating with the UE to authenticate and authorize a network based at least in part on whether the registration request includes the onboarding access request (block 530). For example, the network device (e.g., using transmit processor 220, receive processor 238, controller/processor 240, memory 242, and/or the like) may selectively communicate with the UE to authenticate and authorize a network based at least in part on whether the registration request includes the onboarding access request, as described above.

As further shown in FIG. 5, in some aspects, process 500 may include completing the RA registration after receiving the registration request and based at least in part on selectively communicating with the UE to authenticate and authorize the network (block 540). For example, the network device (e.g., using transmit processor 220, receive processor 238, controller/processor 240, memory 242, and/or the like) may complete the RA registration after receiving the registration request and based at least in part on selectively communicating with the UE to authenticate and authorize the network, as described above.

Process 500 may include additional aspects, such as any single aspect or any combination of aspects described below and/or in connection with one or more other processes described elsewhere herein.

In a first aspect, process 500 includes connecting the UE to a full access credentials provisioning server based at least in part on successfully completing the RA registration.

In a second aspect, alone or in combination with the first aspect, the network is an SNPN or a PLMN.

In a third aspect, alone or in combination with one or more of the first and second aspects, process 500 includes providing information identifying one or more levels of restricted access, wherein the one or more is leveling include at least one of an authenticated level or an onboarding with credentials level.

In a fourth aspect, alone or in combination with one or more of the first through third aspects, the onboarding access request includes a S-NSSAI with a SST indicator set to a configured value for onboarding purpose.

In a fifth aspect, alone or in combination with one or more of the first through fourth aspects, the registration request is included in at least one of a radio resource control message or a non-access stratum message.

In a sixth aspect, alone or in combination with one or more of the first through fifth aspects, the registration request is for onboarding purpose, includes credentials, and is included in at least one of a radio resource control message or a non-access stratum message.

In a seventh aspect, alone or in combination with one or more of the first through sixth aspects, selectively communicating with the UE includes performing an NSSAA procedure using a stored credential.

In an eighth aspect, alone or in combination with one or more of the first through seventh aspects, an extensible access protocol authentication procedure of the NSSAA procedure is based at least in part on a service descriptor value of the onboarding access request.

In a ninth aspect, alone or in combination with one or more of the first through eighth aspects, an AAA server is selected based at least in part on an indicated descriptor value of the onboarding access request.

In a tenth aspect, alone or in combination with one or more of the first through ninth aspects, selectively communicating with the UE includes providing an indicator of a URSP identifying a network selection policy, wherein the network selection policy includes information identifying a set of applications that are authorized to use a single network slice selection assistance information (S-NSSAI) for restricted access.

In an eleventh aspect, alone or in combination with one or more of the first through tenth aspects, selectively communicating with the UE includes providing an indicator of a URSP identifying a network selection policy, wherein the network selection policy includes information identifying one or more of destination Internet Protocol addresses or fully qualified domain names that are authorized for use with a S-NSSAI for restricted access.

In a twelfth aspect, alone or in combination with one or more of the first through eleventh aspects, completing the RA registration includes establishing one or more protocol data unit sessions at one or more data network names associated with one or more of a set of applications based at least in part on a UE route selection policy.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
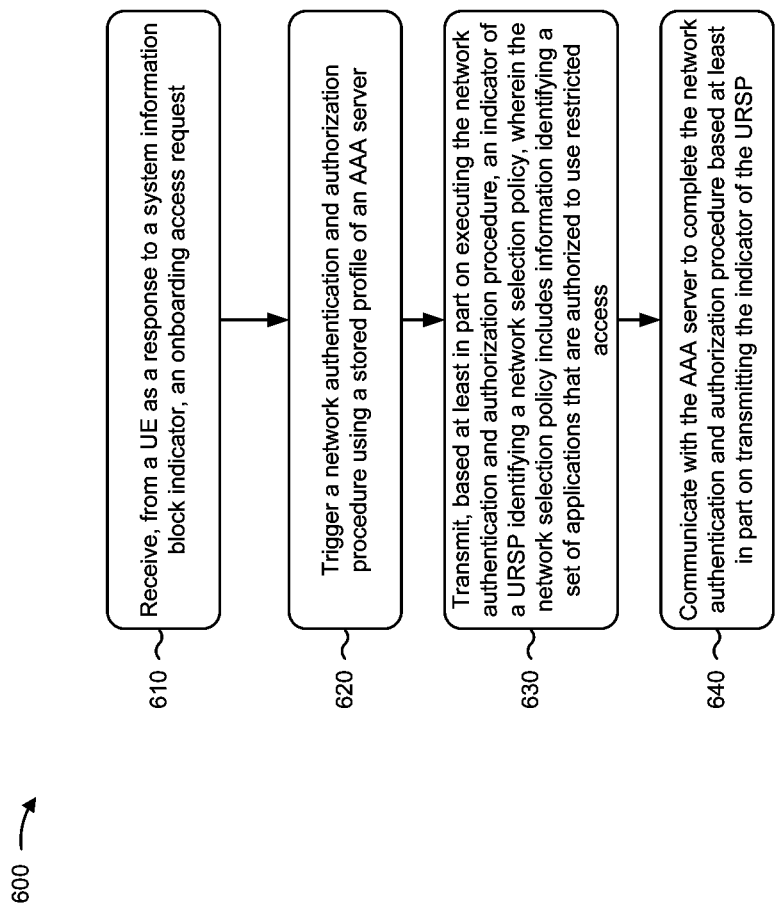
FIG. 6 is a diagram illustrating an example process performed, for example, by a core network node, in accordance with various aspects of the present disclosure.

FIG. 6 is a diagram illustrating an example process 600 performed, for example, by a core network node, in accordance with various aspects of the present disclosure. Example process 600 is an example where the core network node (e.g., BS 110, network controller 130, an AMF, a PCF, an AUSF, an AAA, an SMF, a UPF, and/or the like) performs operations associated with a restricted access procedure.

As shown in FIG. 6, in some aspects, process 600 may include receiving, from a UE as a response to a system information block indicator, an onboarding access request (block 610). For example, the core network node (e.g., using antenna 234, DEMOD 232, MIMO detector 236, receive processor 238, controller/processor 240, and/or the like) may receive, from a UE as a response to a system information block indicator, an onboarding access request, as described above.

As further shown in FIG. 6, in some aspects, process 600 may include triggering a network authentication and authorization procedure using a stored profile of an AAA server (block 620). For example, the core network node (e.g., using controller/processor 240, transmit processor 220, TX MIMO processor 230, MOD 232, antenna 234, and/or the like) may trigger an network authentication and authorization procedure using a stored profile of an AAA server, as described above. In some aspects, the network authentication and authorization procedure may be an NSSAA procedure.

As further shown in FIG. 6, in some aspects, process 600 may include transmitting, based at least in part on executing the network authentication and authorization procedure, an indicator of a URSP identifying a network selection policy, wherein the network selection policy includes information identifying a set of applications that are authorized for restricted access (block 630). For example, the core network node (e.g., using controller/processor 240, transmit processor 220, TX MIMO processor 230, MOD 232, antenna 234, and/or the like) may transmit, based at least in part on executing the network authentication and authorization procedure, an indicator of a URSP identifying a network selection policy, as described above. In some aspects, the network selection policy includes information identifying a set of applications that are authorized for restricted access.

As further shown in FIG. 6, in some aspects, process 600 may include communicating with the AAA server to complete the network authentication and authorization procedure based at least in part on transmitting the indicator of the URSP (block 640). For example, the core network node (e.g., using controller/processor 240, transmit processor 220, TX MIMO processor 230, MOD 232, antenna 234, and/or the like) may communicate with the AAA server to complete the network authentication and authorization procedure based at least in part on transmitting the indicator of the URSP, as described above.

Process 600 may include additional aspects, such as any single aspect or any combination of aspects described below and/or in connection with one or more other processes described elsewhere herein.

In a first aspect, an extensible access protocol authentication procedure of the network authentication and authorization procedure is based at least in part on a service descriptor value of the onboarding access request.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some aspects of the present disclosure:

Aspect 1: A method of wireless communication performed by a user equipment (UE), comprising: transmitting a registration request for restricted access (RA), wherein the registration request selectively includes an onboarding access request; selectively communicating with a onboarding network to authenticate and authorize a particular network based at least in part on whether the registration request includes the onboarding access request; and completing the RA registration after transmitting the registration request and based at least in part on selectively communicating with the onboarding network to authenticate and authorize the particular network.

Aspect 2: The method of aspect 1, further comprising: connecting to a full access credentials provisioning server based at least in part on successfully completing the RA registration.

Aspect 3: The method of any of aspect 1 to 2, further comprising: receiving information from the onboarding network identifying one or more levels of restricted access for onboarding, wherein the one or more levels include at least one of an authenticated level or an onboarding with default credentials level.

Aspect 4: The method of any of aspect 1 to 3, wherein the registration request is included in at least one of a radio resource control message or a non-access stratum message.

Aspect 5: The method of any of aspect 1 to 4, wherein the registration request is for onboarding purpose, includes credentials, and is included in at least one of a radio resource control message or a non-access stratum message.

Aspect 6: The method of any of aspect 1 to 5, wherein an extensible access protocol authentication procedure is based at least in part on a service descriptor value of the onboarding access request.

Aspect 7: The method of aspect 6, wherein an authentication, authorization, and accounting (AAA) server is selected based at least in part on an indicated descriptor value of the onboarding access request.

Aspect 8: The method of any of aspect 1 to 7, wherein selectively communicating with the onboarding network comprises: receiving an indicator of a UE route selection policy (URSP) identifying a network selection policy, wherein the network selection policy includes information identifying a set of applications that are authorized to use restricted access.

Aspect 9: The method of any of aspect 1 to 8, wherein selectively communicating with the onboarding network comprises: receiving an indicator of a UE route selection policy (URSP) identifying a network selection policy, wherein the network selection policy includes information identifying one or more of destination Internet Protocol addresses or fully qualified domain names that are authorized for use with restricted access.

Aspect 10: The method of any of aspect 1 to 9, further comprising: enforcing a UE route selection policy based at least in part on receiving an indicator of the UE route selection policy.

Aspect 11: The method of any of aspect 1 to 10, wherein completing the RA registration comprises: establishing one or more protocol data unit sessions at one or more data network names associated with one or more of a set of applications based at least in part on a UE route selection policy.

Aspect 12: A method of wireless communication performed by a network device, comprising: providing a system information block indicator identifying a set of levels of restricted access (RA) for onboarding, wherein the set of levels includes at least one of an unauthenticated level or an onboarding with default credentials level; receiving, from a user equipment (UE) as a response to the system information block indicator, a registration request for RA registration, wherein the registration request selectively includes an onboarding access request; selectively communicating with the UE to authenticate and authorize a network based at least in part on whether the registration request includes the onboarding access request; and completing the RA registration after receiving the registration request and based at least in part on selectively communicating with the UE to authenticate and authorize the network.

Aspect 13: The method of aspect 12, further comprising: connecting the UE to a full access credentials provisioning server based at least in part on successfully completing the RA registration.

Aspect 14: The method of any of aspect 12 to 13, further comprising: providing information identifying one or more levels of restricted access for onboarding, wherein the one or more levels include at least one of an authenticated level or an onboarding with default credentials level.

Aspect 15: The method of any of aspect 12 to 14, wherein the registration request is for onboarding purpose, includes credentials, and is included in at least one of a radio resource control message or a non-access stratum message.

Aspect 16: The method of any of aspect 12 to 15, wherein an extensible access protocol authentication procedure is based at least in part on a service descriptor value of the onboarding access request.

Aspect 17: The method of aspect 16, wherein an authentication, authorization, and accounting (AAA) server is selected based at least in part on an indicated descriptor value of the onboarding access request.

Aspect 18: The method of any of aspect 12 to 17, wherein selectively communicating with the UE comprises: providing an indicator of a UE route selection policy (URSP) identifying a network selection policy, wherein the network selection policy includes information identifying a set of applications that are authorized to use for restricted access.

Aspect 19: The method of any of aspect 12 to 18, wherein selectively communicating with the UE comprises: providing an indicator of a UE route selection policy (URSP) identifying a network selection policy, wherein the network selection policy includes information identifying one or more of destination Internet Protocol addresses or fully qualified domain names that are authorized for use for restricted access.

Aspect 20: The method of any of aspect 12 to 19, wherein completing the RA registration comprises: establishing one or more protocol data unit sessions at one or more data network names associated with one or more of a set of applications based at least in part on a UE route selection policy.

Aspect 21: A method of wireless communication performed by a core network node, comprising: receiving, from a user equipment (UE) and as a response to a system information block indicator, an onboarding access request;

triggering a network authentication and authorization procedure using a stored profile of an authorization and authentication (AAA) server; transmitting, based at least in part on executing the network authentication and authorization procedure, an indicator of a UE route selection policy (URSP) identifying a network selection policy, wherein the network selection policy includes information identifying a set of applications that are authorized to use restricted access; and communicating with the AAA server to complete the network authentication and authorization procedure based at least in part on transmitting the indicator of the URSP.

Aspect 22: The method of aspect 29, wherein an extensible access protocol authentication procedure of the network authentication and authorization procedure is based at least in part on a service descriptor value of the onboarding access request.

Aspect 23: An apparatus for wireless communication at a device, comprising a processor; memory coupled with the processor; and instructions stored in the memory and executable by the processor to cause the apparatus to perform the method of one or more aspects of aspects 1-11.

Aspect 24: A device for wireless communication, comprising a memory and one or more processors coupled to the memory, the memory and the one or more processors configured to perform the method of one or more aspects of aspects 1-11.

Aspect 25: An apparatus for wireless communication, comprising at least one means for performing the method of one or more aspects of aspects 1-11.

Aspect 26: A non-transitory computer-readable medium storing code for wireless communication, the code comprising instructions executable by a processor to perform the method of one or more aspects of aspects 1-11.

Aspect 27: A non-transitory computer-readable medium storing a set of instructions for wireless communication, the set of instructions comprising one or more instructions that, when executed by one or more processors of a device, cause the device to perform the method of one or more aspects of aspects 1-11.

Aspect 28: An apparatus for wireless communication at a device, comprising a processor; memory coupled with the processor; and instructions stored in the memory and executable by the processor to cause the apparatus to perform the method of one or more aspects of aspects 12-20.

Aspect 29: A device for wireless communication, comprising a memory and one or more processors coupled to the memory, the memory and the one or more processors configured to perform the method of one or more aspects of aspects 12-20.

Aspect 30: An apparatus for wireless communication, comprising at least one means for performing the method of one or more aspects of aspects 12-20.

Aspect 31: A non-transitory computer-readable medium storing code for wireless communication, the code comprising instructions executable by a processor to perform the method of one or more aspects of aspects 12-20.

Aspect 32: A non-transitory computer-readable medium storing a set of instructions for wireless communication, the set of instructions comprising one or more instructions that, when executed by one or more processors of a device, cause the device to perform the method of one or more aspects of aspects 12-20.

Aspect 33: An apparatus for wireless communication at a device, comprising a processor; memory coupled with the processor; and instructions stored in the memory and executable by the processor to cause the apparatus to perform the method of one or more aspects of aspects 21-22.

Aspect 34: A device for wireless communication, comprising a memory and one or more processors coupled to the memory, the memory and the one or more processors configured to perform the method of one or more aspects of aspects 21-22.

Aspect 35: An apparatus for wireless communication, comprising at least one means for performing the method of one or more aspects of aspects 21-22.

Aspect 36: A non-transitory computer-readable medium storing code for wireless communication, the code comprising instructions executable by a processor to perform the method of one or more aspects of aspects 21-22.

Aspect 37: A non-transitory computer-readable medium storing a set of instructions for wireless communication, the set of instructions comprising one or more instructions that, when executed by one or more processors of a device, cause the device to perform the method of one or more aspects of aspects 21-22.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
a memory; and
one or more processors coupled to the memory, the one or more processors configured to:
transmit a registration request for restricted access (RA), wherein the registration request selectively includes an onboarding access request indicating that the registration request is for onboarding in a stand-alone non-public network (SNPN) with default credentials level;
selectively communicate with an onboarding network to authenticate and authorize a particular network using a stored credential based at least in part on whether the registration request includes the onboarding access request; and
complete the RA registration after transmitting the registration request and based at least in part on selectively communicating with the onboarding network to authenticate and authorize the particular network.

2. The UE of claim 1, wherein the one or more processors are further configured to:
connect to a full access credentials provisioning server based at least in part on successfully completing the RA registration.

3. The UE of claim 1, wherein the one or more processors, when transmitting the registration request, are configured to:
transmit the registration request when operating in a limited service state without a full access credential.

4. The UE of claim 1, wherein the one or more processors are further configured to:
receive information from the onboarding network identifying one or more levels of RA for onboarding, wherein the one or more levels include an onboarding with default credentials level.

5. The UE of claim 1, wherein the onboarding access request includes a new access indicator set to a configured value for onboarding purpose.

6. The UE of claim 1, wherein the registration request is included in at least one of a radio resource control message or a non-access stratum message.

7. A method of wireless communication performed by a user equipment (UE), comprising:
transmitting a registration request for restricted access (RA), wherein the registration request selectively includes an onboarding access request indicating that the registration request is for onboarding in a stand-alone non-public network (SNPN) with default credentials level;
selectively communicating with an onboarding network to authenticate and authorize a particular network using a stored credential based at least in part on whether the registration request includes the onboarding access request; and
completing the RA registration after transmitting the registration request and based at least in part on selectively communicating with the onboarding network to authenticate and authorize the particular network.

8. The method of claim 7, further comprising:
connecting to a full access credentials provisioning server based at least in part on successfully completing the RA registration.

9. The method of claim 7, wherein transmitting the registration request comprises:
transmitting the registration request when operating in a limited service state without a full access credential.

10. The method of claim 7, further comprising:
receiving information from the onboarding network identifying one or more levels of RA for onboarding, wherein the one or more levels include at least one of an authenticated level or an onboarding with default credentials level.

11. The method of claim 7, wherein the onboarding access request includes a new access indicator set to a configured value for onboarding purpose.

12. The method of claim 7, wherein the registration request is included in at least one of a radio resource control message or a non-access stratum message.

13. The method of claim 7, wherein the registration request includes credentials and is included in at least one of a radio resource control message or a non-access stratum message.

14. The method of claim 7, wherein an extensible access protocol authentication procedure is based at least in part on a service descriptor value of the onboarding access request.

15. The method of claim 7, wherein an authentication, authorization, and accounting (AAA) server is selected based at least in part on an indicated descriptor value of the onboarding access request.

16. The method of claim 7, wherein selectively communicating with the onboarding network comprises:
receiving an indicator of a UE route selection policy (URSP) identifying a network selection policy, wherein the network selection policy includes information identifying a set of applications that are authorized to use RA.

17. The method of claim 7, wherein selectively communicating with the onboarding network comprises:
receiving an indicator of a UE route selection policy (URSP) identifying a network selection policy, wherein the network selection policy includes information identifying one or more of destination Internet Protocol addresses or fully qualified domain names that are authorized for use with RA.

18. The method of claim 7, further comprising:
enforcing a UE route selection policy (URSP) based at least in part on receiving an indicator of the URSP.

19. The method of claim 7, wherein completing the RA registration comprises:
establishing one or more protocol data unit sessions at one or more data network names associated with one or more of a set of applications based at least in part on a UE route selection policy (URSP).

20. A method of wireless communication performed by a network device, comprising:
providing a system information block indicator identifying a set of levels of restricted access (RA) for onboarding, wherein the set of levels includes at least one of an unauthenticated level or an onboarding with default credentials level;
receiving, from a user equipment (UE) as a response to the system information block indicator, a registration request for RA registration, wherein the registration request selectively includes an onboarding access request with credentials included in a non-access stratum message, wherein the onboarding access request with credentials is indicated as being for onboarding in a stand-alone non-public network (SNPN) with a default credentials level of access;

selectively communicating with the UE to authenticate and authorize a network based at least in part on whether the registration request includes the onboarding access request; and completing the RA registration after receiving the registration request and based at least in part on selectively communicating with the UE to authenticate and authorize the network.

21. The method of claim 20, further comprising:
connecting the UE to a full access credentials provisioning server based at least in part on successfully completing the RA registration.

22. The method of claim 20, further comprising:
providing information identifying one or more levels of RA for onboarding, wherein the one or more levels include at least one of an authenticated level or an onboarding with default credentials level.

23. The method of claim 20, wherein the registration request includes the credentials and is included in at least one of a radio resource control message or a non-access stratum message.

24. The method of claim 20, wherein an extensible access protocol authentication procedure is based at least in part on a service descriptor value of the onboarding access request.

25. The method of claim 20, wherein an authentication, authorization, and accounting (AAA) server is selected based at least in part on an indicated descriptor value of the onboarding access request.

26. The method of claim 20, wherein selectively communicating with the UE comprises:
providing an indicator of a UE route selection policy (URSP) identifying a network selection policy, wherein the network selection policy includes information identifying a set of applications that are authorized to use for RA.

27. The method of claim 20, wherein selectively communicating with the UE comprises:
providing an indicator of a UE route selection policy (URSP) identifying a network selection policy, wherein the network selection policy includes information identifying one or more of destination Internet Protocol addresses or fully qualified domain names that are authorized for use for RA.

28. The method of claim 20, wherein completing the RA registration comprises:
establishing one or more protocol data unit sessions at one or more data network names associated with one or more of a set of applications based at least in part on a UE route selection policy.

29. A method of wireless communication performed by a core network node, comprising:
receiving, from a user equipment (UE) and as a response to a system information block indicator, an onboarding access request with credentials included in a non-access stratum message, wherein the onboarding access request with credentials is indicated as being for onboarding in a stand-alone non-public network (SNPN) with a default credentials level of access;

triggering a network authentication and authorization procedure using a stored profile of an authorization and authentication (AAA) server;

transmitting, based at least in part on executing the network authentication and authorization procedure, an indicator of a UE route selection policy (URSP) identifying a network selection policy, wherein the network selection policy includes information identifying a set of applications that are authorized to use restricted access; and communicating with the AAA server to complete the network authentication and authorization procedure based at least in part on transmitting the indicator of the URSP.

30. The method of claim 29, wherein an extensible access protocol authentication procedure of the network authentication and authorization procedure is based at least in part on a service descriptor value of the onboarding access request.

* * * * *